United States Patent [19]

Abe et al.

[11] Patent Number: 4,883,338

[45] Date of Patent: Nov. 28, 1989

[54] SYNTHETIC RESIN OPTICAL FIBER

[75] Inventors: Tomiya Abe; Yukio Shimazaki; Takanobu Ishibashi; Norimoto Abe; Takayasu Asai; Noriaki Taketani, all of Ibaraki, Japan

[73] Assignee: Hitachi Cable, Ltd. & Hitachi, Ltd., Tokyo, Japan

[21] Appl. No.: 262,334

[22] Filed: Oct. 14, 1988

[30] Foreign Application Priority Data

Oct. 15, 1987 [JP] Japan .................. 62-260380

[51] Int. Cl.$^4$ ............... G02B 6/00; C08F 120/18
[52] U.S. Cl. .................. 350/96.34; 350/96.10; 350/96.29; 350/96.30; 526/329.7
[58] Field of Search ............... 350/96.10, 96.29, 96.30, 350/96.33, 96.34; 427/163; 428/372, 381, 384; 526/329.7

[56] References Cited

U.S. PATENT DOCUMENTS

| | | | |
|---|---|---|---|
| 4,482,204 | 11/1984 | Blyler, Jr. et al. | 350/96.34 |
| 4,615,583 | 10/1986 | Tsuno et al. | 350/96.33 |
| 4,647,153 | 3/1987 | Utsumi et al. | 350/96.34 X |
| 4,798,445 | 1/1989 | Yamamoto et al. | 350/96.34 |
| 4,799,761 | 1/1989 | Yamamoto et al. | 350/96.34 X |
| 4,804,259 | 2/1989 | Sasaki et al. | 350/96.34 |

FOREIGN PATENT DOCUMENTS

| | | | |
|---|---|---|---|
| 8978 | 4/1968 | Japan | 350/96.34 X |
| 60243 | 3/1978 | Japan | 350/96.34 X |
| 8321 | 2/1981 | Japan | 350/96.34 X |
| 8322 | 2/1981 | Japan | 350/96.34 X |
| 8323 | 2/1981 | Japan | 350/96.34 X |
| 45502 | 3/1982 | Japan | 350/96.34 X |
| 190903 | 11/1982 | Japan | 350/96.34 X |
| 34333 | 3/1984 | Japan | 350/96.34 X |

Primary Examiner—William L. Sikes
Assistant Examiner—Brian M. Healy
Attorney, Agent, or Firm—Lowe, Price, LeBlanc, Becker & Shur

[57] ABSTRACT

A synthetic resin optical fiber having the structure simplified and a stable light transmission characteristic is disclosed. The synthetic resin optical fiber comprises a transparent core and a cladding formed around the core, and the cladding has an inner transparent portion and an outer peripheral portion containing a light interruption substance such as a pigment and the like.

5 Claims, 2 Drawing Sheets

SYNTHETIC RESIN OPTICAL FIBER

FIELD OF THE INVENTION

The invention relates to a synthetic resin optical fiber, and more particularly to a synthetic resin optical fiber having the structure simplified.

BACKGROUND OF THE INVENTION

With the development of an information-oriented society, the requirement for high speed processing of a large capacity of information increases more and more in recent years. In such a situation, the optical communication system had been established with the rapid advancement of a series of techniques such as a high purification technique of silica glass, a transmission loss lowering technique, a technique for making a high output, and long life semiconductor laser.

On the other hand, compared with the silica optical fiber occupying the mainstream of the optical communication, the synthetic resin optical fiber has the disadvantage, i.e., a relatively large transmission loss, but it has the following advantages: (1) it is possible to give a large aperture thereto; (2) it is possible to increase the numerical aperture(NA); and (3) it is flexible and easy to handle. Therefore, it is expected to apply this synthetic resin optical fiber to the field of decoration such as a display and the like, and the shortdistance communication as in office and factory automations, communication in an automobile, etc.

A conventional synthetic resin optical fiber comprises a core consisting of a very transparent resin material and a cladding or clad layer consisting of a synthetic resin having a refractive index lower than that of the core material. However, if such an optical fiber is used as it is, the external light will reach to the core to cause increased noise due to the transparent cladding. In order to cut off the external light and to improve the mechanical property against an external, side pressure, etc., a protective layer containing a light interruption substance is provided around the cladding. In general, this protective layer is formed by extrusion molding process, etc. after forming the structure comprising the core and the cladding.

The provision of such a protective layer results in a complicated fabrication process, and thus high production cost, and the problem which the transmission characteristics of the optical fiber is influenced by the stress developed upon heating and the like due to the differences in the coefficient of thermal expansion and the modulus of elasticity of respective constituent materials thereof.

Such a synthetic resin optical fiber is described in Japanese Patent Laid Open No. 190903/82. The synthetic resin optical fiber comprises a core, and a cladding of adhesives, containing a light absorption substance such as carbon etc. and having the same refractive index as that of the core, which is provided on an outer peripheral surface of the core, so that light leaked out of the core is absorbed in the cladding whereby the synthetic resin optical fiber is applied to a transmission of image data. In fact, however, light is leaked from the core to the cladding when it is bent, although external light is interrupted in the presence of the cladding. For this reason, it is difficult that the synthetic resin optical fiber is practically applied to an optical communication.

Another synthetic resin optical fiber is described in Japanese Patent Laid Open No. 34333/74. The synthetic resin optical fiber comprises a core and a cladding provided around the core, both of which are colored by containing organic dye thereby providing a wavelength filtering property. As a result, light of a specific wavelength is only transmitted through the synthetic resin optical fiber. However, it is also difficult that the synthetic resin optical fiber is practically applied to an optical communication because light transmission characteristic is largely deteriorated due to the dye contained in the core.

SUMMARY OF THE INVENTION

Accordingly, it is an object of the invention to provide a synthetic resin optical fiber which can be made by a simplified and inexpensive process.

It is a further object of the invention to provide a synthetic resin optical fiber having an protected layer.

It is a still further object of the invention to provide a synthetic resin optical fiber having a stable transmission characteristic and high reliability.

According to the invention, the synthetic resin optical fiber comprises a transparent core and a cladding formed around the core, and the cladding has an inner transparent portion and an outer peripheral portion containing a light interruption substance such as a pigment and the like.

In the optical fiber, light propagates with repeated refractions within a light path made of the core material while somewhat blurring or spreading into the cladding at the interface between the core and the cladding. It is therefore a matter of course that the core is required to have transparency and the interfacial layer is also required to be transparent.

However, it is reported that in the synthetic resin optical fiber having a large aperture, when light is reflected at the interface between the core and the cladding, the depth of light blurring into the cladding is less than half of a transmitting light wavelength, substantially 1 micron. If a light interruption substance such as a pigment or the like is not existent in this light-blurring layer, it will not lower the transmission characteristics of light.

BRIEF DESCRIPTION OF DRAWINGS

The invention will be described in more detail in conjunction with appended drawings wherein.

DESCRIPTION OF PREFERRED EMBODIMENTS

Figure 1:
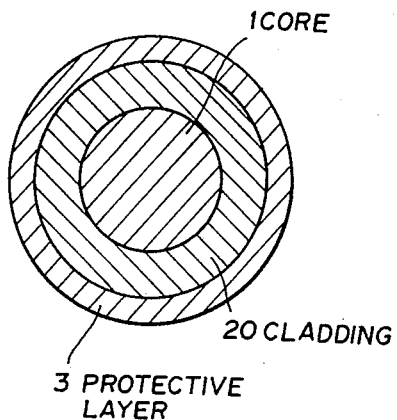
FIG. 1 is a cross sectional view showing a conventional synthetic resin optical fiber.

Before explaining a synthetic resin optical fiber in an embodiment according to the invention, the aforementioned conventional synthetic resin optical fiber will be explained in FIG. 1.

The conventional synthetic resin optical fiber comprises a core 1 made of a resin material having an excellent transparency, and a clad layer or cladding 20 made of a synthetic resin having a refractive index lower than that of the core material. However, with this structure, the light from the outside is reached to the cladding 20 to increase noise due to transparency of the cladding 20. Therefore, in order to cut off the external light and to raise the mechanical strength against an external side pressure, a protective layer 3 containing a light interruption substance such as a pigment or the like is often provided around the cladding 20. This protective layer 3 is generally formed after fabricating the integral structure of the core 1 and the cladding 20.

Figure 2:
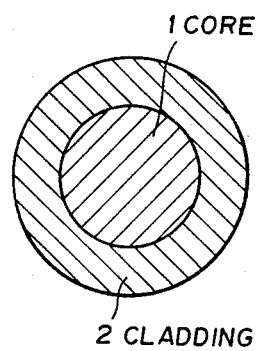
FIG. 2 is a cross sectional view showing a synthetic resin optical fiber according to the invention.

Next, a synthetic resin optical fiber in the embodiment according to the invention will be explained in FIG. 2.

The synthetic resin optical fiber consists of a core 1 and a cladding 2, and the cladding 2 contains a light interruption substance such as carbon black, etc.

Now, the experiments of extrusion molding in which the resin material containing a light interruption substance such as a pigment or the like is extruded to form the cladding 2 have been performed, and it has been found that a resin rich layer is formed in the vicinity of the surfaces in both sides of the extruded layer, and such a light interruption substance is scarcely present within the range of the thickness (that is, region less than half of a transmitting light wavelength, substantially 1 μm) to provide a clad layer or cladding 2 required for propagating the light in the vicinity of the interface between a core and the cladding, and thus, such a region free from the light interruption substance can be provided in the vicinity of the surfaces of the extruded layer by the extrusion molding. As the result, it has been found that a layer having both functions to sheath and to cut off the external light can be simultaneously formed in the cladding 2 by extrusion of the cladding 2 containing the light interruption substance such as a pigment or the like.

However, if the light interruption substance is too much or little, the above mentioned effects can not be obtained.

Practically, a synthetic resin optical fiber was fabricated by extruding a cladding material comprising 6-propylene fluoride-4-ethylene fluoride copolymer and a 0-5 by weight of carbon black having a particle size of 10-20 nm to form a tube-shaped cladding having an inside diameter of 1.5 mm and an outside diameter of 2.2 mm, injecting a monomer composition for a core comprising a 100% by weight of methylmethacrylate and a 0.5% by weight of lauroyl peroxide into the tube-shaped cladding and polymerizing the monomer composition, and the transmission loss and the cut-off characteristics of the external light of the resulting optical fiber were measured. The transmission loss was measured by a 4m-3m cutback method in which light is first passed through an optical fiber having a length of 4m to measure the quantity of light received and then the fiber is cut to 3m length (i.e. cut of 1m length), the quantity of light received by the fiber of 3m length is measured. The cut-off characteristics of the external light was measured by covering both ends of the optical fiber having a length of 1m with a pair of black box 5 each of which can completely cut off light and has a length of 45cm to expose the central portion of the optical fiber having a length of 10cm, exposing this central portion to white light of 20 luxes from a light sourse, detecting the amount of light transmitted through the cladding with an optical power meter 6 (a silicon semiconductor sensor).

The results of determining the transmission loss were as follows:

| Amount of added carbon black (% wt) | Transmission loss (dB) |
| --- | --- |
| 0 | 1 |
| 0.1–0.5 | 2–2.5 |
| 1.0 | 3 |
| 3.0 | 5 |
| 5.0 | 7–10 |

When the amount of carbon black added is more than 5% by weight, it is difficult to form a resin rich layer in the surface of the cladding, and the transmission loss becomes about 12-13 dB. Therefore, the amount of carbon to be added into the material of cladding should be less than 5% by weight, preferably 1% by weight.

Figure 3:
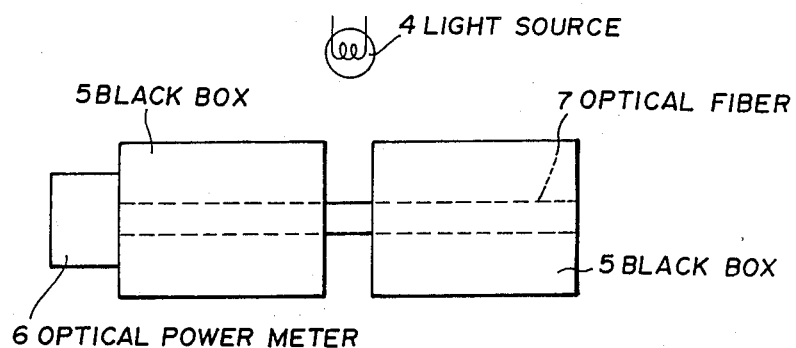
FIG. 3 is an explanatory diagram showing an apparatus for measuring the light transmission loss.
Figure 4:
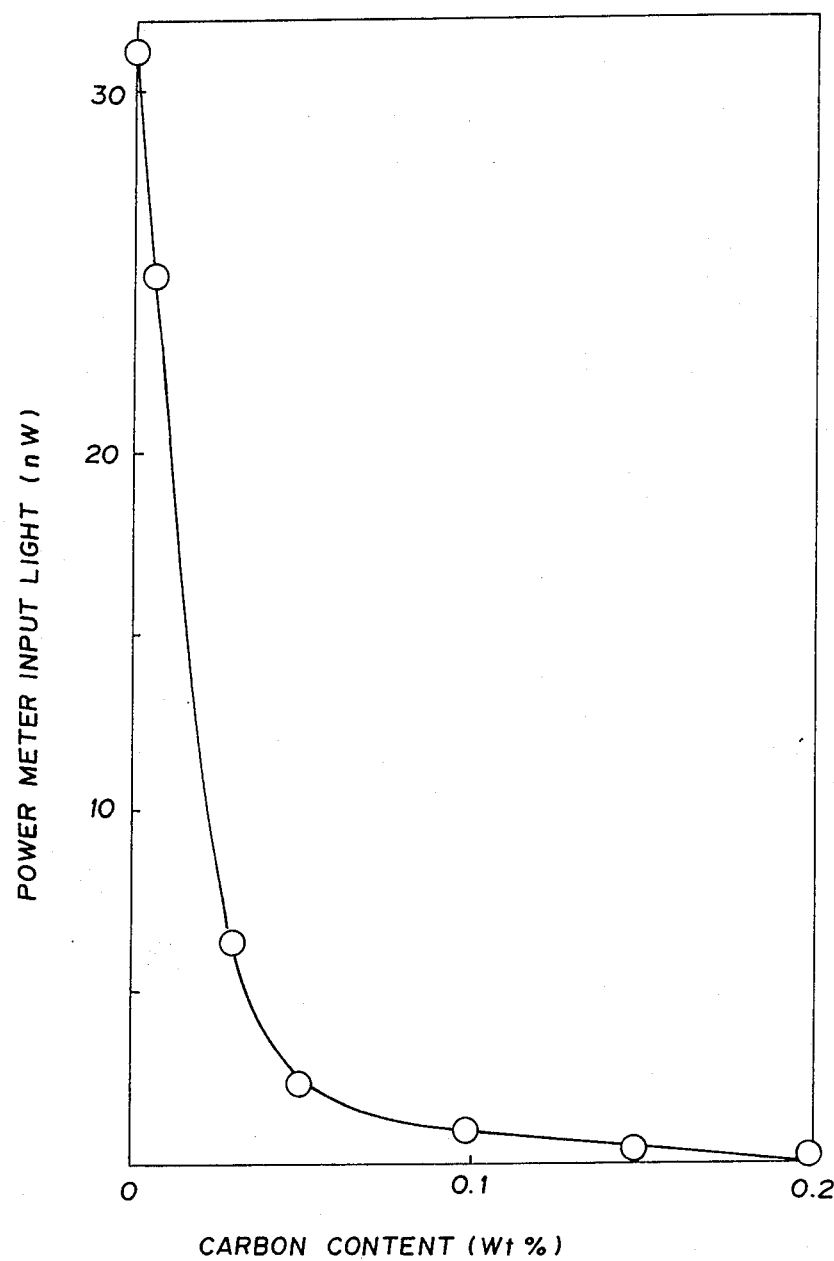
FIG. 4 is a diagram showing the relationship between a carbon content in a cladding and an amount of the external light reached to a core.

The cut-off characteristics of the external light were determined by the apparatus shown in FIG. 3. The results shown in FIG. 4 were obtained. FIG. 4 shows the relationship between the carbon content in the cladding and the amount of the external light reached to the core, and the carbon content is plotted as abscissa and the power meter input (nW) as ordinate.

As clearly shown in FIG. 4, a remarkable cut-off effect of the external light occurs from about 0.03% by weight or more of carbon content. The external light is nearly cut off at 0.2% by weight of carbon content, and it is completely cut off at the carbon content more than 0.2% by weight. In general, although the power of light source in an optical communication is the level of μW, an acceptable noise level in the case where the high sensitivity is required in the side of a photodetector is of the order of less than $10^{-2}$, that is, less than 10 nW, and thus the required carbon content is more than 0.03% by weight, preferably 0.2% by weight.

Therefore, when considering the carbon content from both the aspects of the transmission loss and the cut-off characteristics of external light, it was confirmed that an adequate amount of carbon to be added into a cladding material is 0.03-5% by weight, preferably 0.2-1% by weight.

The light interruption substance such as a pigment, etc. contained in the cladding is not limited to a particular substance so long as it has both the colorability and cut off ability of light. In addition to the carbon black described above, it may include, for example, an inorganic pigment such as graphite, titanium oxide, cobalt oxide, cadmium sulfide, and the like. Similarly, the adequate amount of each of these pigments to be added is 0.03-5% by weight, preferably 0.2-1% by weight. The selection of such pigments is dependent on the material of the cladding. When FEP resin used as a material of the cladding, the organic pigment such as cyanine can not be used because FEP resin is required to be extruded at a temperature of about 400° C and thus such pigments decompose at this temperature.

With respect to the particle size of such a light interruption substance, it is not limited to a particular value so long as it has the colorability and cut-off ability of light. However, the particle size ranging from several nanometers (nm) to several microns is desirable for forming a resin rich layer at the interface between a core and a cladding.

Regarding the core material used in the synthetic resin optical fiber, it is not limited to a particular material so long as it is a transparent synthetic resin having the transmission characteristics of light required for an optical fiber. Exemplary of the core material are alkylmethacrylate copolymers represented by polymethyl methacrylate, styrene copolymers represented by polystyrene, and transparent plastics such as polycarbonate, poly(methyl-1-pentene) and the like.

Further, the core material having a three dimensional bridged structure with the intention of improving the thermal resistance may be used. Exemplary of such a material are silicone resin represented by epoxy resin and polymethylsiloxane, the resin produced by copolymerization of an alkylmethacrylate monomer with a polyfunctional monomer such as trimethylolpropane trimethacrylate, etc., and the resin produced by copolymerization of styrene resin with divinylbenzen, and the like.

The cladding material used in the synthetic resin optical fiber is not limited to a particular material so long as it is a transparent material having the transmission characteristics of light required for the cladding of an optical fiber.

Exemplary of such a material are methacrylic polymers such as polymethylmethacrylate and the like, and such polymers as disclosed in Japanese Patent Publication Nos. 8978/68; 8321/81; 8322/81; and 8323/81; and Japanese Patent Laid Open No. 60243/78, and these polymers are produced by polymerizing the esters comprising methacrylic acid and fluorinated alcohols. Furthermore, tetrafluoroethylene copolymer, tetrafluoroethylenehexafluoroethylene copolymer, ethylene-tetrafluoroethylene copolymer, vinylidene fluoride copolymer, vinylidene fluoride-tetrafluoroethylene copolymer, ethylenevinylacetate copolymer, poly(4-methyl-1-pentene), and the like can be also used.

Further, a process for fabricating the synthetic resin optical fiber is not limited to a specific process so long a light interruption substance such as a pigment or the like is used in the cladding.

For example, such process includes (a) a melt coating process comprising the steps of spinning a molten core material to form a core fiber by an extruder, then melt coating the resulting core fiber with a pigment-containing material for a cladding by an extruder; (b) a simultaneous extrusion molding process in which molten core and cladding materials are simultaneously extruded using a composite die; and (c) the method disclosed in Japanese Patent Laid Open No. 4550/82 which comprises the steps of forming a tube-shaped cladding and thereafter injecting a monomer precusor used for a core into the resulting tube-shaped cladding and curing the monomer precusor; and the like.

The following examples are presented to further explain the present invention, but are not to be construed as limiting the invention.

EXAMPLE 1

A polystyrene melt was extruded to form a core having a diameter of 1 mm using an extruder. The resulting core was coated with a polymethylmethacrylate melt containing 0.08% by weight of carbon black having a particle size of 10–30 mm to form a cladding of 0.3 mm thick around the core. The resulting synthetic resin optical fiber was confirmed to have an excellent light transmission characteristic and an improved cut-off function of the external light. The changes of the light transmission characteristics were not observed even when this optical fiber was warmed to a temperature of 80° C.

EXAMPLE 2

This example demonstrates the use of carbon black in the cladding according to this invention.

A hexafluoropropylene-tetrafluoroethylene copolymer material containing 0.08% by weight of carbon black having a particle size of 10–30 nm was extruded to form a tube-shaped cladding having an outside diameter of 1.8 mm x an inside diameter of 1.0 mm using an extruder. A monomer composition comprising 90 parts by weight of methylacrylate, 20 parts by weight of methacrylate, and 0.5 parts by weight of lauroyl peroxide as a polymerization initiator was injected into the resulting tube-shaped cladding under pressure, and one end opening of the cladding was sealed off. The sealed tube-shaped cladding was passed through a hot water bath kept at 80° C from the other end of the cladding to polymerize the monomer composition, and then was wound up on a bobbin to obtain a synthetic resin optical fiber. The resulting optical fiber was confirmed to have an excellent light transmission characteristic and an improved external light cut off function due to the carbon black pigment contained in the cladding. The changes of the light transmission characteristics were not observed even when this optical fiber was warmed to a temperature of 80° C.

EXAMPLE 3

This example demonstrates the use of titanium oxide in the cladding according to this invention.

A synthetic resin optical fiber was formed by a method similar to that employed in Example 2 except that 1% by weight of titanium oxide having a particle size of 0.1–1 micron was used instead of the carbon black used as a pigment in Example 2. The resulting synthetic resin optical fiber was confirmed to have improved light transmission characteristics and external light cut-off function due to the titanium oxide pigment contained in the cladding. The changes of the light transmission characteristics were not observed even when the optical fiber was warmed to a temperature of 80° C.

EXAMPLE 4

This example demonstrates the use of cadmium oxide in the cladding according to the invention. A synthetic resin optical fiber was formed by a method similar to that employed in Example 2 except that 0.5% by weight of cadmium oxide having a particle size of 0.1–1 micron was used as a pigment instead of the carbon black in Example 2. The resulting synthetic resin optical fiber was confirmed to have improved light transmission characteristics and external light cut-off function. The changes of the light transmission characteristics were not observed even when this optical fiber was warmed to a temperature of 80° C.

EXAMPLE 5

This example demonstrates the use of a cyanine dye in the cladding of this invention. A synthetic resin optical fiber was formed by a method similar to that employed in Example 2 except that 0.05% by weight of copper phthalocyanine blue having particle size of 0.03–0.3 micron was used instead of carbon black in Example 2.

The resulting synthetic resin optical fiber was confirmed to have improved light transmission characteristics and external light cut-off function. The changes of the light transmission characteristics were not observed even when this optical fiber was warmed to a temperature of 80° C.

COMPARATIVE EXAMPLE 1

This comparative example demonstrates the effect without using pigment in the cladding according to the prior art.

A synthetic resin optical fiber was formed by a method similar to that employed in Example 2 without using of a pigment in the cladding material consisting of tetrafluoroethylene-hexafluoropropylene.

The resulting synthetic resin optical fiber had improved light transmission characteristics, but it was confirmed to pass the external light therethrough too.

COMPARATIVE EXAMPLE 2

The synthetic resin optical fiber obtained in Comparative Example 1 was coated with an ethylenetetrafluoroethylene copolymer composition containing 0.1% by weight of carbon black having a particle size of 10-30 nm to form a coating of 0.3 mm thick around the optical fiber. The resulting optical fiber had good light transmission characteristics and light cut-off function, but it was confirmed to have poor light transmission characteristics due to the contraction of the coated layer upon warming it to 80° C.

As described above, the present invention can provide the simplified and inexpensive process for making a synthetic resin optical fiber, and can provide a reliable optical fiber of which light transmission characteristics are not lowered even in a warmed condition without using a particular protective layer. Further, the present invention has the effects capable of cutting off the external light without lowering the transmission characteristics and of a stable light transmission.

Although the preferred embodiment of the present invention has been disclosed by way of example, it will be understood that other modifications may occur to those skilled in the art without departing from the scope and the spirit of the appended claims.

What is claimed is:

1. A synthetic resin optical fiber comprising:
   a core of a transparent synthetic resin for the transmission of light and having a first predetermined refractive index; and
   a cladding formed around the core and having a second predetermined refractive index lower than said first predetermined refractive index, said cladding layer containing 0.03 to 5 weight % of a light interruption substance such as a pigment or the like in a region of said cladding layer equal to or greater than half a wavelength of transmission light from the interface between said core and said cladding layer, said cladding layer including a region less than half a wavelength of transmission light from the interface between said core and cladding layer that is substantially free of the light interruption substance.

2. A synthetic resin optical fiber according to claim 1, wherein said light interruption substance is at least one selected from carbon black, graphite, a metal oxide, a metal sulfide, and an organic pigment.

3. A synthetic resin optical fiber according to claim 1, wherein said cladding layer contains 0.05 to 1% by weight of said light interruption substance therein.

4. A synthetic resin optical fiber according to claim 1, wherein said cladding layer is of a resin selected from hexafluoroethylene-tetrafluoropropylene copolymer, ethylene-tetrafluoroethylene copolymer, vinylidene fluoride polymer, vinylidene fluoride-tetrafluoroethylene polymer, tetrafluoroethylene-perfluou-alkylvinylether copolymer, chlorotrifluoroethylene polymer, vinyl acetateethylene copolymer, tetramethyl-1-pentene polymer, and methylmethacrylate polymer.

5. A synthetic resin optical fiber comprising:
   a core of a transparent synthetic resin for the transmission of light and having a first predetermined refractive index; and
   a cladding layer formed around said core and having a second refractive index lower than first predetermined refractive index, said cladding layer containing 0.03 to 5 weight % of a light interruption substance such as a pigment or the like in a region of said cladding layer equal to or greater than 1 μm from the interface between said core and said cladding layer, said cladding layer including a region less than 1 μm from the interface between said core and cladding layer that is substantially free of the light interruption substance.

* * * * *